United States Patent
Sugata et al.

(10) Patent No.: US 6,923,604 B2
(45) Date of Patent: Aug. 2, 2005

(54) SPINDLE DEVICE OF MACHINE TOOL

(75) Inventors: Shinsuke Sugata, Hiroshima (JP); Tadashi Makiyama, Hiroshima (JP)

(73) Assignee: Horkos Corp., Fukuyama (JP)

( * ) Notice: Subject to any disclaimer, the term of this patent is extended or adjusted under 35 U.S.C. 154(b) by 178 days.

(21) Appl. No.: 10/470,921
(22) PCT Filed: Feb. 12, 2002
(86) PCT No.: PCT/JP02/01158
§ 371 (c)(1),
(2), (4) Date: Aug. 1, 2003
(87) PCT Pub. No.: WO02/064311
PCT Pub. Date: Aug. 22, 2002

(65) Prior Publication Data
US 2004/0067113 A1 Apr. 8, 2004

(30) Foreign Application Priority Data
Feb. 16, 2001 (JP) ........................................ 2001-040143

(51) Int. Cl.$^7$ ............................. B23C 9/00; B23Q 11/10
(52) U.S. Cl. ........................................ 409/136; 408/59
(58) Field of Search ................................ 409/135–136; 408/56–61; 184/6.14, 6.26

(56) References Cited

U.S. PATENT DOCUMENTS

| | | | | |
|---|---|---|---|---|
| 5,676,506 A | * | 10/1997 | Sugata ........................ | 409/136 |
| 6,123,270 A | * | 9/2000 | Hara ........................... | 408/61 |
| 6,582,167 B1 | * | 6/2003 | Sugata et al. ............... | 409/136 |
| 6,602,031 B2 | * | 8/2003 | Hara ........................... | 408/59 |

FOREIGN PATENT DOCUMENTS

| | | | |
|---|---|---|---|
| EP | 860231 A1 | * | 8/1998 |
| JP | 4-144709 A | | 5/1992 |
| JP | 2687110 B2 | * | 3/1997 |
| JP | 11-235641 A | | 8/1999 |
| JP | 2001-18148 A | | 1/2001 |

* cited by examiner

*Primary Examiner*—Erica Cadugan
(74) *Attorney, Agent, or Firm*—Merek, Blackmon & Voorhees, LLC

(57) ABSTRACT

A spindle device of a machine tool capable of preventing coolant mist from being excessively liquefied in an area between a mist outlet member 23 and near the rear end part of a tool 29, wherein a straight feed pipe 14 formed of a double tube having an inside tube 14a and an outside tube 14b is inserted into an inside hole formed at the center part of a spindle 2 in non-rotating state not coming into contact with the spindle, coolant is fed to the inside tube 14a, compressed air is fed to the outside tube 14b, and a mist generating member 16 is formed of both tubes near the inside tip part of the spindle, a mist outlet member 23 is installed into the outside tube 14b integrally with each on the mist outlet passage c of the mist generating member 16 so as to surround the mist outlet passage and a mist guiding extension member 24 allowed to reach near the rear end part of the tool in the center hole of the tool holder is installed, integrally with the spindle, on the other tool holder 8 side, and the mist guiding passage f of the mist guiding extension member 24 is allowed to communicate with the mist outlet passage c of the mist outlet member 23 through both a rotary joint 25 and a pressing tube member 27.

4 Claims, 2 Drawing Sheets

SPINDLE DEVICE OF MACHINE TOOL

FIELD OF THE INVENTION

The present invention relates to a spindle device of a machine tool for generating coolant mist in a spindle.

BACKGROUND OF THE INVENTION

A machine tool with a spindle device having a mist generating member in a center hole of a spindle driven for rotation has been disclosed in a prior art reference, for example, Japanese Patent No. 2687110 and Japanese Patent Provisional Publication No. 235641 of 1999. As shown therein, coolant mists spouted from a non-rotatable mist outlet member of the mist generating member escape from a tip opening of a tool through a center hole of a tool holder before the mist outlet member.

In this machine tool, the diameter of a mist passage from the front end of the mist outlet member to the rear end of the tool changes in size comparatively greatly, and the mist passage part with comparatively large diameter is rotated together with the spindle. Therefore, coolant mists are liquefied in the mist passage over permissible limits by big pressure change, speed change and centrifugal force, and come not to flow out of the tip opening of the tool constantly. Accordingly, the quality of machining drops and unusual wear of a tool is caused.

The present invention aims to provide a spindle device of a machine tool that can settle these problems.

SUMMARY OF THE INVENTION

To achieve the above-mentioned purpose, this invention is characterized by a machine tool, wherein a straight feed pipe formed of a double tube having an inside tube and an outside tube is inserted into an inside hole formed at the center of a spindle driven for rotation in non-rotating state not coming into contact with the spindle, coolant is fed to the inside tube, compressed air is fed to the outside tube, and a mist generating member is formed of both tubes near an inside tip part of the spindle, a mist outlet member is installed into the outside tube integrally with each other on the mist outlet passage of the mist generating member so as to surround the mist outlet passage, a mist guiding extension member allowed to reach near the rear end of a tool in a center hole of a tool holder is installed integrally with the spindle on the other tool holder side, and a mist guiding passage of the mist guiding extension member is allowed to communicate with the mist outlet passage of the mist outlet member through both a rotary joint and a pressing tube member.

Coolant mists generated by the mist generating member reach the rear end of the tool through the mist outlet passages of the mist outlet member, the rotary joint and the mist guiding extension member, thereafter flowing out of the tip of the tool through a mist passage of the tool. In this case, since the mist outlet passages of the mist guiding extension member and the rotary joint are comparatively small in diameter. Accordingly, the coolant mists passing through the mist outlet passages do not receive big centrifugal force by spindle rotation as well as strong gas-liquid separation action by the centrifugal force. Therefore, the coolant mists generated by the mist generating member reach the rear end of the tool from the mist outlet member in suitable fog, and flow into the mist passage of the tool smoothly, and flow out of the tip of the tool stably continuously.

Besides, the cross-sectional area of the mist outlet passage from the mist outlet member to the rear end of the tool comes not to be changed at each different position in its longitudinal direction greatly. Therefore, the coolant mists in the mist outlet passage are effectively prevented from being liquefied by pressure change.

Moreover, thanks to the mist outlet member, the coolant mists leaked from the rotary joint are prevented from flowing into an interfitted hole of the tool holder through the inside hole of the spindle. Here, an in-spindle interfitting part is inserted into the interfitted hole. Besides, since the inside hole of the tool holder is airtightly communicated with the mist guiding extension member, the coolant mists are prevented from flowing into the interfitted hole.

The above-mentioned invention may be put into concrete as follows.

That is, a longitudinal through hole is provided to a tool position engaging means, and the front end of the mist guiding extension member is inserted through a sealing member therein. Here, the tool position engaging means is fitted on the rear end of the tool within the tool holder to prevent the tool from moving rearward.

According to this, a through hole of the tool position engaging means conventionally provided in the tool holder feeds coolant mists to the rear end of the tool certainly. Besides, the through hole is airtightly communicated with the mist outlet passage of the mist guiding extension member by the sealing member, and the mist guiding extension member is extracted from or inserted in the through hole easily.

In this case, it is preferable that the in-spindle interfitting part of the tool holder forms a straight tube, the tool position engaging means is provided therein, and the length of the mist guiding extension member inserted into the longitudinal through hole of the tool position engaging means is shortened than the length of the in-spindle interfitting part. According to this, when attaching or detaching the tool holder to the spindle, the mist guiding extension member comes and goes to the longitudinal through hole in the state that the in-spindle interfitting part is closely guided to an inside hole 2a of the spindle. Therefore, the mist guiding extension member and the tool position engaging means can evade their mutual contact without any attention.

Furthermore, the rotary joint is constructed as follows. That is, the rotary joint comprises two bodies of a forward slidably contacting ring member and a rearward slidably contacting ring member. The forward slidably contacting ring member is fixed on the rear end surface of the mist guiding extension member, and the rearward slidably contacting ring member is fixed on the front end surface of a pressing tube member. Here, both ring members are longitudinally opposite to each other, so that the forward slidably contacting ring member rotates together with the spindle and the rearward slidably contacting ring member does not rotate in the center of the spindle.

According to this, coolant mists reached the front of the mist outlet member press the rear surface of the pressing tube member, thereby pressurizedly welding the forward slidably contacting ring member and the rearward slidably contacting ring member airtightly with relative rotation permitted. Therefore, while the spindle rotates, the mist outlet passage of the mist outlet member comes to communicate with that of the mist guiding extension member airtightly.

Besides, mist passages of the mist outlet member, the pressing tube member, the rotary joint and the mist guiding extension member are arranged in line and the diameter in the longitudinal direction forms an almost fixed size.

According to this, the cross-sectional area of a mist outlet passage does not much change at the different position of the mist outlet passages in the longitudinal direction. Further, since the mist outlet passages of the mist outlet member, the pressing tube member, the rotary joint and the mist guiding extension member are arranged in line, coolant mists flowing in the mist outlet passages cease to cause pressure change. Therefore, the liquefaction of coolant mists is prevented effectively.

PREFERRED EMBODIMENT OF THE INVENTION

Figure 1:
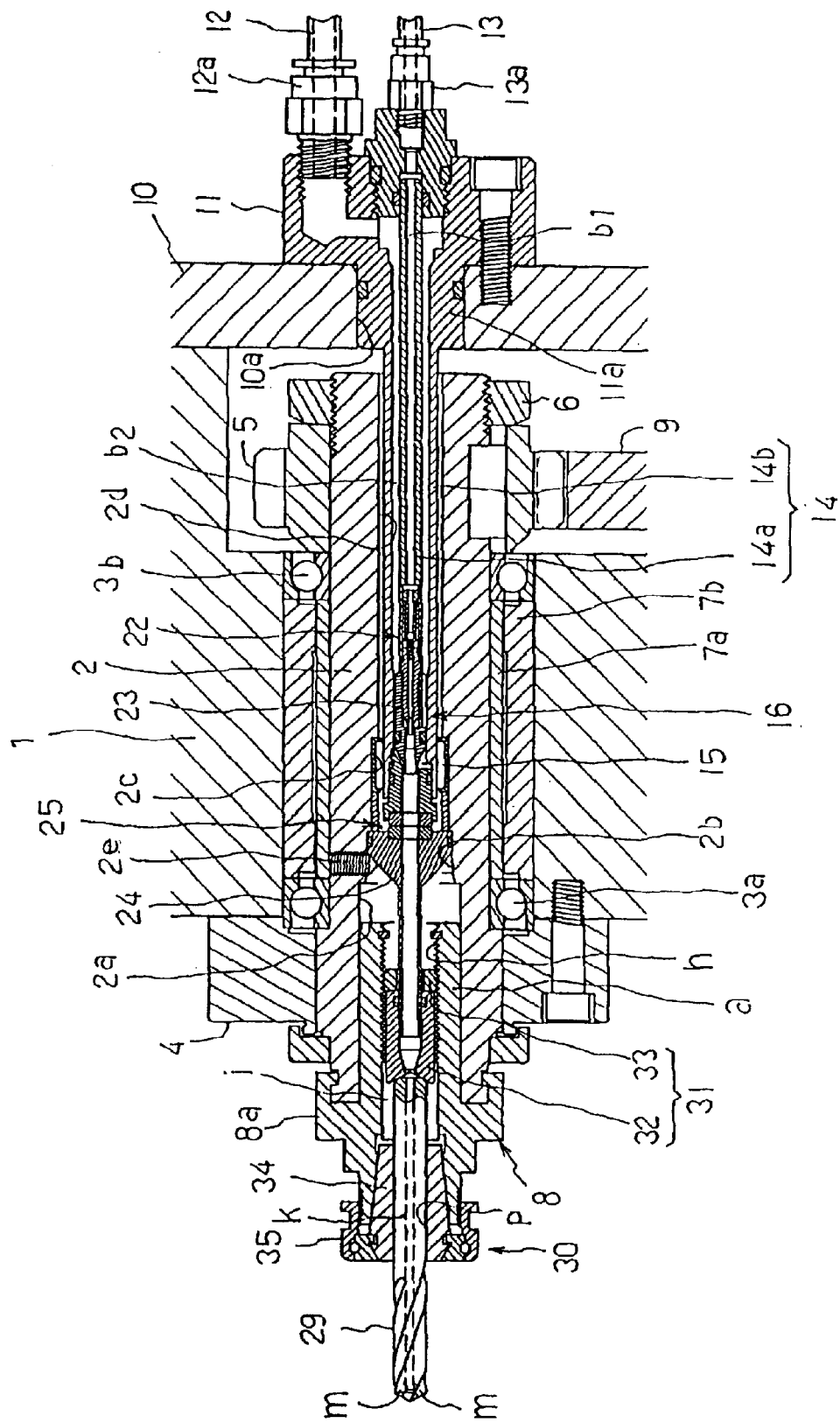
FIG. 1 is a sectional view from side sight showing a spindle device of a machine tool concerning an embodiment of the invention.

The invention will be described with reference to the drawings.

In these drawings, 1 is a main body frame of a spindle device, and therein, a spindle 2 is inserted through ball bearings 3a, 3b rotatively at a fixed position.

In this case, 4 is a ring member bolted to the front surface of the frame 1 fixedly, and 5 is an input gear inserted and key-fixed to the rear end of the spindle 2 externally. Numeral 6 is a nut body for regulating the input gear 5 from getting out of the spindle 2, screwed into the rear end of the spindle 2. Numeral 7a, 7b are cylindrical spacers for regulating the longitudinal positions of the ball bearings 3a, 3b.

The spindle 2 has an interfitted hole 2a with a straight tubular surface at the tip center thereof and three straight center holes 2b, 2c, 2d in uneven diameter to the interfitted hole 2a continuously. Numeral 8 is a tool holder consisting chiefly of a holder main body part 8a, and an in-spindle interfitting part, which is a part of the main body part 8a, is internally fitted to the interfitted hole 2a.

Numeral 9 is a transmission gear for biting with the input gear 5, rotatively supported to the frame 1. Here, a not-illustrated motor transmits rotation to the transmission gear 9.

Numeral 10 is an additional frame provided behind the spindle 2, and a through hole 10a is provided just behind the spindle 2. A tubular interfitting part 11a of a feed passage member 11 is inserted into the through hole 10a, and the rear part of the feed passage member 11 is fixedly bolted to the additional frame 10. A splicing fitting 12a for connecting a compressed air feed line 12 and a splicing fitting 13a for connecting a coolant feed line 13 are screwed into the rear end of the feeding passage member 11, respectively.

A straight feed pipe 14 not touching with the spindle 2 is inserted into the center hole 2d of the spindle 2 concentrically and irrotationally. The feed pipe 14 forms a double tube having an inside tube 14a and an outside tube 14b, and the inside hole of the inside tube 14a forms a fluid passage b1, and a space between the inside tube 14a and the outside tube 14b forms a compressed air passage b2.

A ball bearing 15 for rotatively supporting the outside tube 14b is provided between the front part of the outside tube 14b and the center hole 2c. The rear end of the inside tube 14a is inserted into the center hole of the splicing fitting 13a fluid-tightly, and the front end thereof is fluid-tightly combined with the rear part of a mist generating member 16 that is nonrotatably provided into the tip of the outside tube 14b.

The mist generating member 16 generates mists from coolant fed through the fluid passage b1 and compressed air fed through the compressed air passage b2. The details will be explained with reference to FIG. 2 as follows.

That is, the mist generating member 16 has a tubular coolant ejecting nozzle member 17, and the rear end of the nozzle member 17 is internally fitted into the front end of the inside tube 14a. The nozzle member 17 forms a tubular member with a longitudinal center hole 17a. The front part of the nozzle member 17 forms a tapered conical male surface part 17b, and the diameter of the rearward center hole 17a forms somewhat large. And one end of a coil spring 18 is inserted into the center hole 17a in the state that the forward movement is restricted.

A coolant outlet control valve means 22 comprising a sheeting tube member 19, a spherical valve element 20 and a valve guiding tube member 21 is provided behind the nozzle member 17 within the forward inside hole of the inside tube 14a. Here, the spherical valve element 20 is pressed to a forward sheet part of the tube member 19 by the coil spring 18, and the valve guiding tube member 21 is externally fitted on the tube member 19 as surrounding the spherical valve element 20. Besides, a mist outlet member 23 is externally fitted on the forward small-diameter part of the nozzle member 17, and internally fitted into the tip of the outside tube 14b airtightly by an O-ring.

The mist outlet member 23 is formed as follows. That is, it has a tapered conical male surface part 23a, the forward small-diameter part of an inside hole "c" thereof forms a mist outlet passage, the tip of the conical male surface part 17b is positioned at the inside center of the mist outlet passage "c", and a narrow compressed air groove passage "e" is longitudinally provided on the periphery thereof. In this case, the passage "e" communicates with a space surrounded by the periphery of the conical male surface part 17b and the rearward large-diameter part "d". Here, the compressed air in the compressed air passage b2 reaches the front part of the mist outlet passage "c" through the compressed air groove passage "e", a space surrounding the conical male surface part 17b and a ring space between the tip of the conical male surface part 17b and the mist outlet passage "c". The mist generating member 16 is composed thus.

A mist guiding extension member 24 is provided in the spindle 2 in front of the mist outlet member 23. Here, the extension member 24 comprises a large-diameter part 24a and a comparative small-diameter straight tube 24b. The large-diameter part 24a is internally fitted into the center hole 2a of the spindle airtightly through the O-ring, and the small-diameter straight tube 24b is forwardly extended from the large-diameter part 24a. Numeral 2e is a positioning thread member screwed in a thread hole formed to the radial part of the spindle, regulating the large-diameter part 24a from moving forward and rotating around the rotating center of the spindle.

A mist outlet passage "f" formed to the center of the extension member 24 and the mist outlet passage "c" of the mist outlet member 23 are arranged in line, having a diameter in almost fixed size in their longitudinal direction.

A rotary joint 25 is provided between the extension member 24 and the mist outlet member 23. The rotary joint 25 is a mechanical seal for communicating the mist outlet passage "c" to the mist outlet passage "f" fluid-tightly in relatively rotatable state. Here, the rotary joint 25 is constructed so that a forward slidably contacting ring member 26 made of metallic materials and a rearward slidably contacting ring member 28 made of carbon materials are made to oppose each other. The forward slidably contacting ring member 26 is fitly installed on the rear end surface of the large-diameter part 24a and the rearward slidably contacting ring member 28 is fitly installed on the front end surface of a pressing tube member 27. Here, the pressing tube member 27 is inserted into a longitudinal guiding hole b3 formed near the front part of the mist outlet member 23 within the tip of the outside tube 14b slidably in the longitudinal direction and airtightly by the O-ring.

In this case, the pressing tube member 27 has a protrusion 27a at the rear end, and the protrusion 27a is fitted on an engaging groove b4 formed to the inner surface of the outside tube 14b behind the longitudinal guiding hole b4. Therefore, the pressing tube member 27 is prevented from rotating around the center of the spindle 2.

Inside holes g1, g2, g3 of the ring members 26, 28 and the pressing tube member 27 act as mist outlet passages, respectively. The mist outlet passages g1, g2, g3 are arranged in line to the mist outlet passages "c", "f", and their diameter at an optional position is agreed with that of the mist outlet passages "C", "f".

Figure 2:
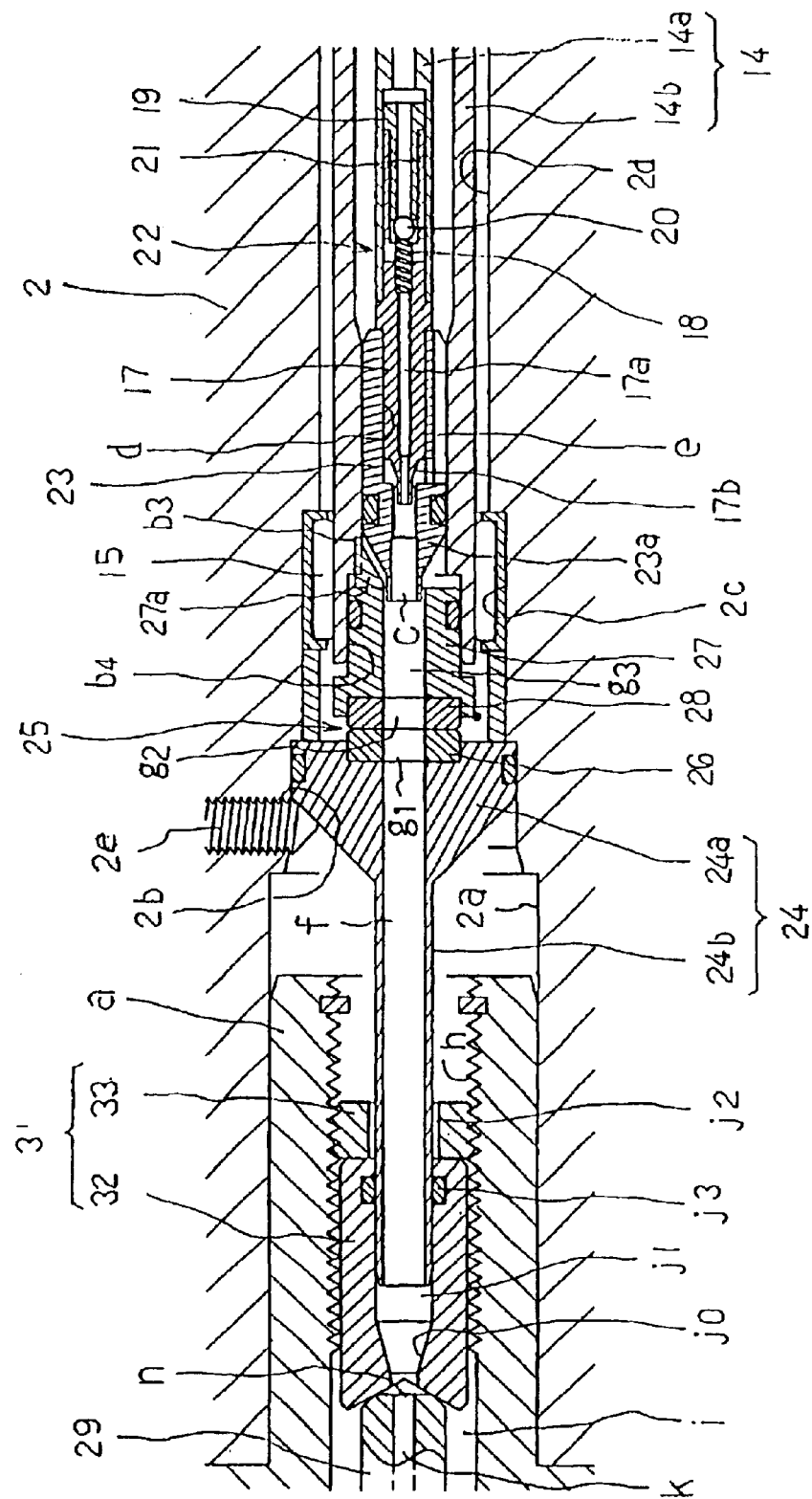
FIG. 2 is a sectional view from side sight showing an important part thereof.

The tool holder 8 has a collet chuck 30 and a center hole "i". The collet chuck 30 combines to fix the periphery of a tool 29 located to the front of the holder main part 8a. The center hole "i" is provided with a thread "h" at the center thereof as shown in FIG. 2. And a tool position engaging means 31 is provided to the center hole "i".

The engaging means 31 has a tool engaging member 32 and a male thread member 33. The tool engaging member 32 is inserted in the center hole "i", touching with the rear end surface of the tool 29. The male thread member 33 is screwed in the thread "h" of the center hole "i", controlling the longitudinal position of the tool engaging member 32. Besides, longitudinal through holes j1, j2 are formed at the centers of the tool engaging member 32 and the male thread member 33, respectively. The tip of the straight tube 24b is airtightly inserted into the through holes j1, j2 through an O-ring. The inserted length is shorter than the longitudinal length of the in-spindle interfitting part "a".

In this case, the through holes j1, j2 form respectively small diameters resembling the mist outlet passage "f" of the extension member 24 as much as possible. Besides, they are connected to the rear end of the tool 29 through a tapered conical female surface part j0, shortening flow distance of coolant mists as much as possible.

The collet chuck 30 comprises a collet 34 and an operating nut part 35. The collet 34 surrounds the periphery of the tool 29, and the operating nut part 35 displaces the collet 34 rearward.

Besides, the tool 29 has a straight mist passage "k" at the center. The front end of the mist passage "k" forms two forked passages for communicating with outlet openings "m", "m" putting the center of a specified diameter of the tip surface of the tool therebetween. The rear end of the mist passage "k" communicates with an inlet opening "n" at the center of the rear end surface of the tool 29. Though the tool 29 is a twist drill in the illustrated examples, it is not limited to this.

Next, a use example of thus constructed spindle device and an operation thereof will be explained as follows.

The tool 29 is detached by rotating an operating nut part 35 of the collet chuck 30 to loosen and displacing the collet 34 forward. In this case, the center hole "p" of the collet 34 forms spread diameter. When attaching the tool 29, the rear part of the tool 29 is inserted in the center hole "p" until the rear end thereof touches with the front surface of the tool engaging member 32. And then, the operating nut part 35 is rotated to fasten keeping in touching state, and the collet 34 is displaced reward. In this case, the center hole "p" of the collet 34 forms reduced diameter by an wedge effect of the tapered surface of the holder main body 8a, thereby fixing the tool 29 on the holder main body 8a connectively.

When changing the position of the tool 29 to the holder main body 8a in the longitudinal direction, the tool holder 8 is released from combination with the spindle 2 to be detached therefrom. Then, the male thread member 33 is suitably rotated in the state that the tool 29 is detached from the holder main body 8a or in the state that the tool 29 in the tool holder 8 is longitudinally displaced. Accordingly, the male thread member 33 is displaced in a fixed direction related to the above-mentioned rotating direction by thread feeding action, and the position of the tool engaging member 32 to the holder main body 8a is adjustably changed. Thereafter, the tool 29 in the tool holder 8 is fixed on the holder main body 8a in the state that the rear end surface of the tool 29 is touched on the front end surface of the tool engaging member 32. And thus, the tool holder 8 is attached on the spindle 2.

When attaching or detaching the tool holder 8 to the spindle 2, the in-spindle interfitting part "a" of the holder main body 8a is abstracted from or inserted in the interfitted hole 2a. Since the interfitting part "a" is accurately guided in a longitudinal direction of the center of the spindle 2 by the interfitted hole 2a, the extension member 24 is restricted from touching with the through holes j1, j2 of the engaging means 31.

Next, a machining state of a work will be explained. The spindle 2 receives not-illustrated motor's rotation through the transmission gear 9 and the input gear 5, rotating at a specified position of the frame 1 supportably by the ball bearings 3a, 3b. Then, the spindle 2 transfers the rotation to the tool 29 through the holder main body 8a and the collet chuck 30. In this case, the engaging means 31 is also rotated integrally with the holder main body 8a.

On the other hand, since the front end of the feed pipe 14 is supported by the ball bearing 15 and the rear end thereof is supported integrally with the additional frame 10, the feed pipe 14 is nonrotatable regardless of the spindle rotation. Accordingly, the mist generating member 16 provided integrally with the feed pipe 14 can also keep in non-rotating state.

Compressed air and coolant are fed from the feed lines 12, 13 to the feed passage member 11. According to this, the compressed air spouts into the mist outlet passage "c" through the compressed air passage b2, the groove passage "e" and an ambient space of the conical male surface part 17b between the outside tube 14b and the inside tube 14a. Besides, the coolant spouts into the center of the mist outlet passage "c" through the fluid passage b1, the center hole of the tube member 19, an ambient space of the spherical valve element 20 and the center hole 17a of the nozzle member 17 within the inside tube 14a.

The coolant spouted into the mist outlet passage "c" is mixed with the compressed air spouted therein by flow energy, and forms coolant mists in the state that fine coolant grains are equally dispersed in air. Thereafter, the coolant mists are flowed out of the outlet openings "m", "m" through the mist outlet passages g1, g2, g3, the through holes j1, j2 and the mist passage "k". Thus flowed coolant mists lubricate and cool frictional positions between the tool 29 and the work.

While the coolant mists flow in the spindle 2 and the tool holder 8, the coolant mists reached the inside hole b3 of the outside tube 14b in front of the mist outlet member 23 acts so as to press the rear surface of the pressing tube member 27. Therefore, the ring member 28 is pressed to the ring member 26, thereby pressurizedly welding these opposite end surfaces. While the spindle 2 rotates, the ring member 26 is rotated integrally with the spindle 2 through the extension member 24, whereas the ring member 28 is nonrotatable due to the feed passage member 11, the outside tube 14b and the pressing tube member 27. Accordingly, the ring members 26, 28 relatively rotate in pressure welding state. In this case, since end surfaces of the ring members 26, 28 are airtightly contacted, the rotary joint 25 communicates the mist outlet passage "c" to the mist outlet passage "f" airtightly with relative rotation permitted.

While the rotary joint 25 works, coolant mists are controlled so as to leak out of a space between the end surfaces of the ring members 26, 28 at an almost ignorable degree. Though the leaked coolant mists contribute to lubricate the ball bearing 15, since there are the large-diameter part 24a of the extension member 24 and the O-ring fitted on the periphery thereof, the leaked coolant mists are certainly prevented from leaking into the interfitted hole 2a.

Besides, though the coolant mists leaked out of the extension member 24 shall leak into the rearward space of the engaging member 32 through a ring-shaped space formed between the through hole j1 and the periphery of the tube part 24b, the O-ring of a sealing member certainly prevents coolant mists from leaking out. Therefore, the male thread member of the tool holder, the in-spindle interfitting part and the inner surface of the interfitted hole of the spindle keep on not adhering dust thereto. Besides, it is convenient for exchanging a tool holder or for changing a tool position to the holder main body.

Thus coolant mists flowed out of the outlet openings "m", "m" of the tip surface of the tool 29 have a tendency to be liquefied by pressure change, speed change and centrifugal force. However, the mist outlet passages "c", g1, g2, g3, "f" are arranged in line so as to be not much different in diameter longitudinally, and besides, the mist outlet passage "f" reaches near the rear end of the tool 29. Therefore, the coolant mists are controlled in large pressure change and speed change, and do not receive large centrifugal force caused by rotation of the spindle 2. Accordingly, liquefaction between the mist generating member 16 and the rear end of the tool 29 is effectively prevented.

The coolant mists flowed out of the extension member 24 flow into the mist passage "k" through the through hole j1. In this case, the through hole j1 forms a small-diameter closely resembling the mist outlet passage "f", communicated to the input opening "n" through the tapered conical female part j0, besides shortening the flow distance of coolant mists. Therefore, the coolant mists have large pressure change and speed change controlled, and do not receive large centrifugal force. Besides, it takes a short time to receive the centrifugal force. Accordingly, liquefaction within the engaging member 32 is also prevented effectively.

Besides, since most of mist passage "k" is arranged at the center of the tool 29, coolant mists flowing therein receive comparative small centrifugal force in comparison with the mist passage "k" formed apart from the center of the tool 29. Accordingly, the coolant mists are also effectively prevented from being liquefied in the tool 29.

Since the front end of the mist passage "k" forks to form the outlet openings "m", "m" putting the center of the specified diameter of the tip surface of the tool 29 therebetween, coolant mists flowed out of the outlet openings "m", "m" are equally fed the whole tip surface of the tool 29 to lubricate it effectively.

According to thus constructed invention, the mist outlet passages of the mist guiding extension member and the rotary joint are formed into a comparative small diameter. Accordingly, large centrifugal force due to rotation of the spindle acts upon coolant mists flowing from the mist outlet member to the rear end of the tool, thereby preventing the coolant mists from being liquefied effectively. Therefore, the coolant mists generated by the mist generating member reach the rear end of the tool from the mist outlet member in a suitable fog, smoothly flowing in the mist passage of the tool, besides stably flowing out of the tip opening of the tool constantly.

Besides, the mist outlet passage from the mist outlet member to the rear end of the tool is easily formed into such a structure that the cross-sectional area does not abruptly change to different position in the longitudinal direction. Therefore, liquefaction by pressure change of coolant mists in the mist outlet passage is easily prevented. Here, the pressure change is caused by an abrupt change of the cross-sectional area of the mist outlet passage.

Moreover, the mist outlet passage prevents coolant mists leaked out of the rotary joint from flowing into the interfitted hole into which the in-spindle interfitting part of the tool holder is inserted through the inside hole of the spindle. Besides, since the mist guiding extension member is airtightly communicated to the inside hole of the tool holder, coolant mists flowed out of the mist guiding extension member are prevented from flowing into the in-spindle interfitted hole. Therefore, the in-spindle interfitting part and the interfitted hole are effectively prevented from dirty by oil or dust.

According to the invention in addition to the above-mentioned effects, coolant mists are certainly fed to the rear end of the tool through a through hole of a conventional tool position engaging means. Besides, since the sealing member airtightly communicates the mist outlet passage of the mist guiding extension member to the through hole of the tool position engaging means, the coolant mists are certainly prevented from flowing into the interfitted hole of the spindle and the mist guiding extension member is easily put into and pulled out the through hole.

According to the invention the forward slidably contacting ring member and the rearward slidably contacting ring member are airtightly welded by pressure of coolant mists reached the inside hole of the outside tube of the straight feed pipe in front of the mist outlet member with relative rotation permitted. Therefore, the mist outlet passage of the mist outlet member can greatly airtightly communicate with the mist outlet passage of the mist guiding extension member.

According to the invention coolant mists flowing in the mist outlet passages of the mist outlet member, the rotary joint, the pressing tube member and the mist guiding extension member hardly cause pressure change, thereby preventing coolant from being liquefied effectively.

What is claimed is:

1. A spindle device of a machine tool comprising:
   a spindle (2) driven for rotation, said spindle having an inside hole at the center;
   a straight feed pipe (14) formed of a double tube having an inside tube (14a) and an outside tube (14b) the straight feed pipe being in the inside hole in a non-rotating state and out of contact with the spindle, coolant being fed into said inside tube (14a), and compressed air being fed into said outside tube (14b);

a mist generating member (16) provided near an inside tip part of the spindle, said mist generating member being formed by the inside tube (14a) and the outside tube (14b), and a mist outlet member (23) in and integral with said outside tube (14b), said mist outlet member defining a mist outlet passage (c); and a mist guiding extension member (24) extending adjacent to a rear end part of a tool in a center hole of a tool holder (8), the extension member being integral with said spindle, said mist guiding extension member having a mist guiding passage (f) in communication with the mist outlet passage (c) of said mist outlet member (23) through both a rotary joint (25) and a pressing tube member (27).

2. A spindle device of a machine tool as claimed in claim 1, wherein a tool position engaging means (31) having through holes (j1, j2) at the center is installed in the center hole of the tool holder (8) so as to touch a rear end of the tool (29) and to prevent the tool from moving rearward, and a front end part of the mist guiding extension member (24) extends into said through holes (j1, j2) and through a sealing member (j3).

3. A spindle device of a machine tool as claimed in claim 1, wherein the rotary joint (25) comprises a forward slidably contacting ring member (26) and a rearward slidably contacting ring member (28), said forward slidably contacting ring member (26) is fixed on a rear end surface of the mist guiding extension member (24) and said rearward slidably contacting ring member (28) is fixed on a front surface of the pressing tube member (27) so that said forward slidably contacting ring member and said rearward slidably contacting ring member are opposite each other longitudinally, and the forward slidably contacting ring member (26) rotates with the spindle and the rearward slidably contacting ring member (28) does not rotate with the spindle.

4. A spindle device of a machine tool as claimed in claim 1, wherein the pressing tube member (27), the rotary joint (25) and the mist guiding extension member (24) each has a mist outlet passage, all of said mist outlet passages being arranged in line, and passage diameters of different positions in their longitudinal direction are made a fixed size.

* * * * *